United States Patent [19]

Sugikawa et al.

[11] 4,228,141
[45] Oct. 14, 1980

[54] PROCESS FOR A GASIFICATION OF GRAPHITE

[75] Inventors: Susumu Sugikawa, Tohkai; Mitsuru Maeda, Mito; Takeshi Tsujino, Tohkai, all of Japan

[73] Assignee: Japan Atomic Energy Research Institute, Tokyo, Japan

[21] Appl. No.: 883,801

[22] Filed: Mar. 6, 1978

[30] Foreign Application Priority Data

Mar. 7, 1977 [JP] Japan ................................ 52-24601

[51] Int. Cl.$^2$ ............................................. C01B 31/18
[52] U.S. Cl. .................................... 423/415 A; 423/4; 423/19; 252/301.1 W
[58] Field of Search .................... 423/415 A, 4, 19; 252/301.1 R, 301.1 W

[56] References Cited

U.S. PATENT DOCUMENTS

| 3,393,049 | 7/1968 | Aron et al. | 423/415 A |
| 3,714,323 | 1/1973 | Dolci et al. | 423/415 A |

OTHER PUBLICATIONS

Masterson et al., "Chemical Principles", 2nd Ed., W. B. Saunders Co., Philadelphia, 1969, pp. 299, 300 & 362.
Turkdogan et al., "Catalytic Oxidation of Carbon", Carbon, vol. 10, pp. 97–111, Pergaman Press., Great Britain.
Shelet, "Catalysis of the C–CO$_2$ Reaction by Group VIII Metals", Chemistry & Physics of Carbon, vol. 4, pp. 324–325, 1968.

*Primary Examiner*—Earl C. Thomas
*Attorney, Agent, or Firm*—Frishauf, Holtz, Goodman & Woodward

[57] ABSTRACT

A graphite can be easily and completely gasified by soaking the graphite in a catalyst solution of a nitrate of a gasification catalyst selected from the group consisting of cobalt, nickel and iron and nitric acid to impregnate the graphite with the gasification catalyst and then gasifying the thus catalyst-impregnated graphite at temperatures above 1000° C. And further a graphite can be easily and completely gasified by soaking the graphite in a catalyst solution of cobalt nitrate, sodium nitrate and nitric acid to add the mixing catalyst of cobalt and sodium to the graphite uniformly and then gasifying the thus catalyst-added graphite at temperatures below 900° C.

8 Claims, No Drawings

PROCESS FOR A GASIFICATION OF GRAPHITE

BACKGROUND OF THE INVENTION

1. Field of the Invention

This invention relates to a process for gasification of a graphite.

2. Description of the Prior Art

A process for removal of graphite by combustion with oxygen or air has been conventionally employed for pretreatment process in the reprocessing of spent fuel of graphite-moderated reactor such as high-temperature gas-cooled reactor or spent contaminated moderator or reflector of the graphite-moderated reactor. However, this conventional process involves a problem to be solved in lowering the amount of radioactivity which is liberated and minimization of the amount of radioactive waste, that is, in connection with the fixation or separation of radioactive C-14 in combustion off-gas. That is to say, this conventional process is unfortunately an extreme exothermic reaction and requires the fixation of the carbon dioxide gas containing radio-active C-14 by, for example, lime and, therefore, produces a large amount of waste.

As an alternative to the conventional process the inventors have developed this invention wherein the graphite is gasified without the generation of heat by using carbon dioxide gas as the gasifying agent and the carbon monoxide formed is pyrolyzed to recover the carbon and the carbon dioxide gas is recycled.

Since the rate of reaction of the gasification of the graphite by carbon dioxide gas is very slow, the gasification of the graphite by carbon dioxide gas absolutely requires a catalyst.

Iron group elements such as iron, cobalt and, nickel, alkaline metal such as sodium etc., vanadium and halogen are conventionally used as the gasification catalyst; above all iron, cobalt and nickel are known to be high in activity. The catalytic activities of these gasification catalysts conventionally used are maintained during the reaction at reaction temperatures above 1000° C.; however, they can not be maintained until the termination of the reaction at reaction temperatures below 900° C. and the defect of the gasification catalysts conventionally used that the rate of reaction lowers rapidly after 50–80 percent of the graphite has been gasified can not be eliminated. In certain cases, however, for example, if limitations are encountered with the materials of the reactor, it is required to carry out the gasification of the graphite at temperatures below 900° C. The reason for lowering of the rate of reaction has been continuously studied by a number of investigators. However, it goes without saying that the method for adding the gasification catalyst to the graphite is very significant in the gasification of graphite and that the method for adding the gasification catalyst to the graphite should be selected according to the reaction temperature for gasification of graphite, that is whether it is above 1000° C. or it is below 900° C.

Two methods for adding the catalyst are discussed in the fundamental study. One is mixing the powdered graphite with the catalyst powder and the other is soaking the graphite in an aqueous solution of the salt of the catalyst with non-nitric acid solvent. However, taking into consideration that the reprocessing of fuel requires operations carried out under high radioactivity, the complete treatment of the powder and the powderization of the graphite accompanied with the breakage of coated particles should preferably be avoided.

In order to eliminate the defects of the conventional process as stated above, we have found a process for a gasification of the graphite, particularly improvements in the method for adding a gasification catalyst to the graphite in the gasification of the graphite.

SUMMARY OF THE INVENTION

It is, therefore, an object of this invention to provide a simple method for adding a gasification catalyst to the graphite directly without the breakage of the graphite in the gasification of the graphite.

It is a further object of this invention to provide a process for gasification of the graphite at reaction temperatures above 1000° C.

Another object of this invention is to provide a process for gasification of 99% or more of the graphite at reaction temperatures below 900° C.

It is a further object of this invention to provide a simple method for adding a gasification catalyst to the graphite directly and uniformly in the gasification of the graphite by soaking the graphite in a catalytic solution of the nitrate of the gasification catalyst and nitric acid.

It is a further object of this invention to provide a simple method for adding a gasification catalyst to the graphite directly and uniformly in the gasification of the graphite by soaking the graphite in a catalytic solution of the nitrate of the gasification catalyst selected from the group consisting of cobalt, nickel and iron and nitric acid.

It is still a further object of this invention to provide a process for adding a mixed catalyst of cobalt and sodium to the graphite uniformly by soaking the graphite in a catalytic solution of cobalt nitrate, sodium nitrate and nitric acid.

Other objects and advantages of the present invention will be apparent to those skilled in the art from a consideration of the description of this invention.

DETAILED DESCRIPTION OF THE INVENTION

This invention relates to a process for gasification of graphite; more specifically it relates to a process for gasification of the graphite characterized by a method for adding a gasification catalyst to the graphite uniformly and directly.

In order to eliminate the defects of the conventional art as stated above, the inventors of this invention studied the gasification of the graphite from the standpoint of the reaction temperature; that is, the inventors of this invention studied two kinds of gasification of the graphite. One is the gasification at a temperature above 1000° C. and the other is that at a temperature below 900° C.

Therefore, one embodiment of this invention wherein the gasification of the graphite is carried out at temperatures above 1000° C. is illustrated below by referring to iron, a commonly used gasification catalyst.

In accordance with this invention, a graphite block or compact is soaked in a catalyst solution of 1–14 M/l or nitric acid and 0.22 M/l of iron (III) nitrate [$Fe(NO_3)_3$] at temperatures of from 20° to 90° C. After the graphite is impregnated up to its center with 400–2000 ppm of iron, the catalyst-impregnated graphite is dried at temperatures of from about 20° to 100° C. for one hour and 100 percent of carbon monoxide (CO) or nitrogen ($N_2$) is introduced at temperatures of from 850° to 1000° C. for 0.5 hour to activate the catalyst. When the $CO_2$ gas is introduced at a temperature above 1000° C., the graphite block or compact is gasified to carbon monoxide (CO) seven times or more as quickly as when no catalyst is used. (That is, when the catalyst of this invention is used, the rate of reaction is about seven or more times that when no catalyst is used.)

The iron (III) nitrate and nitric acid used in this invention are inexpensive and readily available.

The process for the gasification of the graphite at a temperature above 1000° C. as stated above was further developed by the inventors for the gasification of the graphite at a temperature below 900° C. as explained below.

The inventors studied the use of a combination of cobalt, which is stable to oxidation by a catalyst and can be activated automatically in $CO-CO_2$ system, and sodium having low melting point and high vapor pressure effective for elimination of the catalyst added in the graphite in the gasification of the graphite, and consequently, discovered the fact that 99% or more of the graphite can be gasified by carbon dioxide without the lowering of the reaction rate by using a mixed catalyst of cobalt and sodium.

That is to say, in accordance with this invention, the graphite block or compact is impregnated with a catalytic solution of cobalt nitrate, sodium nitrate and nitric acid; then thus impregnated-graphite is heated at a temperature above 100° C. in air or nitrogen to remove water and nitric acid from the graphite and the mixed catalyst of cobalt and sodium is added uniformly to the graphite, and then said graphite to which said catalyst was added is heated at a temperature below 900° C. in the presence of carbon dioxide gas to gasify 99% or more of the graphite.

Therefore, one embodiment of the gasification of the graphite carried out at a temperature below 900° C. is illustrated below;

In accordance with this invention, a fuel compact comprising coated-particle fuel and graphite matrix or a graphite block used for sleeve material or moderator or reflector is soaked in the solution of 1-18 M of nitric acid ($HNO_3$), 0.6-1.5 M of cobaltous nitrate $Co(NO_3)_2$ and 0.5-1.5 M of sodium nitrate ($Na(NO_3)$) at temperatures of from 20° to 80° C. for 1-5 hours to impregnate the compact or block with the solution. Then the thus solution-impregnated compact or block is heated at a temperature above 100° C. for 1-2 hours in an atmosphere of air or nitrogen to remove water and nitric acid from the compact or graphite and mixed catalyst of cobalt and sodium is added to the fuel compact or graphite block uniformly, and then when the fuel compact or graphite block is contacted with 100 percent of carbon dioxide at a temperature below 900° C. for 6-7.5 hours, 99 percent or more of the fuel compact or graphite block is completely gasified and removed and coated-particles having silicon carbide (SiC) outer layer can be recovered in the case of fuel compact.

This invention will be further clarified with reference to the following illustrative embodiments, which are intended to be purely exemplary and are not to be construed in any limiting sense.

REFERENCE EXAMPLES A1–A7

Graphite blocks (20 mm × 20 mm × 45 mm) or graphite compacts [24 mm diameter (8 mm inside diameter) × 45 mm] were soaked in the catalyst solutions shown in Table-1 under the conditions for impregnation shown in Table-1. And then the catalyst-impregnated graphite blocks or compacts were taken out of the catalyst solutions and each specimen of graphite was split into two parts to collect the central portions of the graphite. And the amount of catalyst impregnated in the central portion of the graphite was measured and the results are reported in Table-1.

TABLE-1

| Reference Example No. | Specimen | Catalyst solution | Condition for impregnation temp. (°C.) | hour (h) | Amount of catalyst impregnated in central portion of graphite (ppm) | |
|---|---|---|---|---|---|---|
| A1 | Graphite block (20 mm × 20 mm × 45 mm) | 14M-$HNO_3$ 0.22M-$Fe(NO_3)_3$ | 90 | 1 | Fe | 1200 |
| A2 | Graphite block (20 mm × 20 mm × 45 mm) | 1M-$HNO_3$ 0.22M-$Fe(NO_3)_3$ | " | " | Fe | 400 |
| A3 | Graphite compact [24 mm φ (8 mm inside φ) × 45 mm] | 14M-$HNO_3$ 0.22M-$Fe(NO_3)_3$ | 20 | 5 | Fe | 2000 |
| A4 | Graphite compact [24 mm φ (8 mm inside φ) × 45 mm] | 14M-$HNO_3$ 0.22M-$Fe(NO_3)_3$ | " | " | Fe | 1300 |
| A5 | Graphite compact [24 mm φ (8 mm inside φ) × 45 mm] | 14M-$HNO_3$ 0.22M-$Fe(NO_3)_3$ | " | " | Fe | 500 |
| A6 | Graphite compact [24 mm φ (8 mm inside φ) × 45 mm] | 14M-$HNO_3$ 0.22M-$Fe(NO_3)_3$ | " | " | Ni | 2000 |
| A7 | Graphite compact [24 mm φ (8 mm inside φ) × 45 mm] | 14M-$HNO_3$ 0.22M-$Fe(NO_3)_3$ | " | " | Co | 2000 |

EXAMPLE 1

The graphite compact to which Fe was added in accordance with the procedure of Reference Example A3 was dried in the air at 100° C. for one hour and 100 percent of carbon monoxide was introduced at 1000° C. for 0.5 hour and then 100 percent of carbon dioxide was introduced for 4.5 hours to gasify 88% of the graphite.

EXAMPLE 2

A graphite compact [24 mm diameter (8 mm inside diameter) × 45 mm] packed with coated-particle fuels which is an imitation fuel for high-temperature gas-cooled reactor was used as the specimen.

Iron was added to the specimen in accordance with the procedure of Reference Example A3. Then, the iron-added specimen was dried in the air at 100° C. for one hour and 100 percent of carbon monoxide was introduced at 1000° C. for 0.5 hour and then 100 percent of carbon dioxide was introduced for 6 hours to gasify approximately 100 percent of the graphite matrix.

REFERENCE EXAMPLE 1

A graphite compact the same as used in Reference Example A3 which was not impregnated with catalyst was contacted with 100 percent of carbon dioxide at 1000° C. It took seven hours to gasify 21% of the graphite.

EXAMPLE 3

A fuel compact (25 mm$\phi^{od}$×8 mm$\phi^{Id}$×40 mm$^L$) comprising coated particles and graphite matrix was soaked in the solution of 0.66 M of Co(NO$_3$)$_2$ 0.5 M of NaNO$_3$ and 14 M of HNO$_3$ at 20° C. for 5 hours to impregnate the fuel compact with the solution and, then the fuel compact was heated at 100° C. for 2 hours to remove the water and nitric acid from the fuel compact; thus the mixed catalyst of cobalt and sodium was added to the graphite matrix. Thereafter, the fuel compact was allowed to contact with 100 percent of carbon dioxide at 850° C. for 7.5 hours to gasify 99 percent or more of the graphite matrix and lowering of the reaction rate was not observed.

EXAMPLE 4

A graphite block (20 mm×15 mm×10 mm) was used.

A mixed catalyst of cobalt and sodium was added up to the center of the graphite block in the same way as used in Example 3. 99 percent or more of the graphite was gasified within 6 hours.

REFERENCE EXAMPLE 3

A fuel compact (25 mm$\phi^{od}$×8 mm$\phi^{Id}$×40 mm$^L$) comprising coated-particles and graphite matrix or a graphite compact (20 mm×15 mm×10 mm) was allowed to contact with 100% of carbon dioxide at 850° C. for 7 hours, but only 5% of the graphite was gasified.

REFERENCE EXAMPLE 4

The same fuel compact as used in Reference Example 3 was soaked in the solution of 0.66 M of Co(NH$_3$)$_2$ and 14 M of HNO$_3$ at 20° C. for 5 hours to impregnate the fuel compact with the solution. Then, the fuel compact was heated at 100° C. for 2 hours in the air to remove water and nitric acid from the fuel compact and cobalt was added to the fuel compact. Thereafter, when the cobalt-added fuel compact was allowed to contact with 100 percent of carbon dioxide at 850° C., 77 percent of the graphite matrix was gasified within 4 hours and only 85 percent of the graphite was gasified within 7 hours.

REFERENCE EXAMPLE 5

Sodium catalyst was added to the graphite matrix of the same fuel compact as used in Reference Example 1 by using the solution of 0.5 M of NaNO$_3$ and 14 M of HNO$_3$ in the same way as disclosed in Reference Example 1. Thereafter, the sodium-added fuel compact was allowed to contact with 100 percent of carbon dioxide for 7 hours but only 50 percent of the graphite was gasified.

By the descriptions of the Examples and Reference Examples it is proved that the gasification catalyst can be easily added to the graphite in the gasification of the graphite in accordance with this invention and that such catalyst-added graphite can be more rapidly gasified than graphite with no catalyst added.

We claim:

1. A process for gasification of graphite blocks comprising soaking the graphite block in a solution comprising a nitrate of a gasification catalyst selected from the group consisting of iron, cobalt or nickel and nitric acid at temperatures of from 20°–90° C. to impregnate the graphite block with the gasification catalyst and then contacting the catalysts-containing graphite block with carbon dioxide at a temperature above 1000° C. and gasifying said graphite.

2. The process of claim 1, in which the gasification catalyst is selected from the group consisting of iron, cobalt and nickel.

3. The process of claim 1, in which the concentration of the nitric acid is from 1 to 14 M/l.

4. A process for gasification of solid graphite which is not in powder form comprising impregnating the graphite with an aqueous solution of cobalt nitrate, sodium nitrate and nitric acid, heating the solution-impregnated graphite at a temperature above 100° C. to remove water and nitric acid from the graphite, thereby admixing a mixed catalyst of cobalt and sodium with the graphite and then heating the graphite at a temperature below 900° C. in the presence of carbon dioxide sufficient to gasify the graphite in the form of carbon monoxide.

5. The process of claim 4, wherein said aqueous solution comprises 1–18 M nitric acid, 0.6–1.5 M cobaltous nitrate, and 0.5–1.5 M sodium nitrate.

6. The process of claim 5, wherein said graphite is gasified at a temperature of about 850° C.

7. The process of claim 6, wherein said aqueous solution contains 0.66 M of cobaltous nitrate, 0.5 M sodium nitrate, and 14 M nitric acid.

8. The process of claim 3, wherein said graphite is impregnated with between 400 and 2000 ppm of said gasification catalyst.

* * * * *